United States Patent
Dichtl et al.

(10) Patent No.: US 6,969,446 B1
(45) Date of Patent: Nov. 29, 2005

(54) METHOD FOR PRODUCING CONCENTRATED NITRIC ACID AND INSTALLATION FOR CARRYING OUT A METHOD OF THIS TYPE

(75) Inventors: Gottfried Dichtl, Nieder-Olm (DE);
Frank Dorstewitz, Wiesbaden (DE);
Manfred Sassenberg, Mainz (DE);
Ulrich Walter, Idstein (DE)

(73) Assignee: QVF Engineering GmbH, Mainz (DE)

( * ) Notice: Subject to any disclaimer, the term of this patent is extended or adjusted under 35 U.S.C. 154(b) by 0 days.

(21) Appl. No.: 10/296,297

(22) PCT Filed: May 22, 2000

(86) PCT No.: PCT/EP00/04641

§ 371 (c)(1),
(2), (4) Date: Dec. 19, 2002

(87) PCT Pub. No.: WO01/89989

PCT Pub. Date: Nov. 29, 2001

(51) Int. Cl.[7] .......................... B01D 3/34; C01B 21/44; C01B 21/46

(52) U.S. Cl. .......................... 203/13; 159/2.1; 159/23; 159/47.1; 159/DIG. 19; 159/DIG. 20; 202/154; 202/173; 202/235; 202/205; 203/22; 203/25; 203/78; 203/79; 203/80; 203/88; 203/50; 423/390.1

(58) Field of Search .......................... 203/13, 73, 78–80, 203/35, 50, 49, 22, 25, 88; 159/47.1, DIG. 16, 159/DIG. 19, DIG. 20, 2.1, 23, 46; 202/154, 202/205, 173, 235; 423/390.1

(56) References Cited

U.S. PATENT DOCUMENTS

| | | | | |
|---|---|---|---|---|
| 1,163,174 A | * | 12/1915 | Raschig | 203/13 |
| 1,895,492 A | * | 1/1933 | Shapleigh | 203/13 |
| 1,921,255 A | * | 8/1933 | Hechenbleikner | 203/2 |
| 1,922,289 A | * | 8/1933 | Handforth | 203/13 |
| 4,966,276 A | * | 10/1990 | Guenkel | 203/13 |
| 5,589,037 A | * | 12/1996 | Guggenheim et al. | 203/35 |

FOREIGN PATENT DOCUMENTS

DE   305553   5/1917

(Continued)

OTHER PUBLICATIONS

Schott-Engineering, published by Schott-Engineering GmbH, Germany.

(Continued)

*Primary Examiner*—Virginia Manoharan
(74) *Attorney, Agent, or Firm*—Henry M. Feiereisen; Ursula B. Day

(57) ABSTRACT

Process for producing a nitric acid of a concentration from 75 to 99.9% from a more diluted nitric acid, wherein a nitric acid of a concentration of about 45 to 70% is rectified in contact with a liquid extraction medium to prevent the formation of a nitric acid-water-azeotropic mixture, and the vapors of the concentrated nitric acid are condensed and a concentrated nitric acid is obtained and wherein additionally the extraction medium is reconstituted through reconcentration and returned into the extractive rectification, wherein the nitric acid to be concentrated is fed as a boiling liquid or partially vaporized to the extractive rectification preferably carried out in two columns (K 1.0, K 1.1), by utilizing the amounts of heat available to the entire process (W1, W2, W5), wherein, before feeding into the extractive rectification nitric acid is added to the extraction medium, and the energy required for the extractive rectification is supplied through indirect heating (W4, W8) and the extraction medium supplied in most concentrated form to the extractive rectification, so that simultaneously at the greatest possible dilution of the extraction medium flowing from the extractive rectification, the circulation amount of extraction medium is minimized and the utilization of energy maximized.

25 Claims, 5 Drawing Sheets

FOREIGN PATENT DOCUMENTS

DE    1 056 095    4/1959
EP    0 330 351    8/1989
FR    2.003.298    11/1969

OTHER PUBLICATIONS

Salpetersäure, in: Ullmanns Enzyklp[ädie der technischen Chemie, 4th Edition, vol. 20, pp. 324-326.

* cited by examiner

METHOD FOR PRODUCING CONCENTRATED NITRIC ACID AND INSTALLATION FOR CARRYING OUT A METHOD OF THIS TYPE

BACKGROUND OF THE INVENTION

The invention relates to a process for producing a nitric acid with the concentration of 75 to 99.9% from a diluted, respectively an impure nitric acid, wherein a nitric acid of a concentration from about 45 to 70% is brought into contact with a fluid extraction medium to prevent formation of a nitric acid-water-azeotropic mixture, which is rectified above normal pressure and/or normal pressure and/or vacuum and wherein the vapors of the concentrated nitric acid are condensed to thereby obtain a concentrated nitric acid, and wherein additionally, the extraction medium is regenerated and by means of reconcentration returned to the extractive rectification; as well as an installation for carrying out a preferred embodiment of such a process.

Nitric acid of higher concentration, oftentimes more than 98% by weight $HNO_3$, is required for many organic reactions such as, for example nitrogenizations.

Conventional production methods produce nitric acid of about 65 to 67% by weight $HNO_3$. Thus, an additional process is required in order to obtain highly concentrated nitric acid. The most suitable process for concentrating nitric acid beyond the azeotropic point is the extractive rectification. Thereby, liquid extraction media are used, in particular concentrated sulfuric acid or aqueous solutions of magnesium nitrate solutions, wherein the extraction medium used is predominantly sulfuric acid.

The thermodynamic bases of the extractive rectification utilizing an extraction medium are as follows:

The component system, nitric acid/water exhibits at ambient pressure (1 bar absolute) a maximal azeotropic mixture with a boiling point temperature of 121.8° C. at 69.2% weight $HNO_3$. For nitric acid concentrations below the azeotropic point, water is the more volatile component. Above the azeotropic point, $HNO_3$ is contained in the vapor phase in higher concentration. For production of highly concentrated nitric acid, it is necessary to circumvent the azeotropic point or respectively to overcome it. It has been known for a long time that with the aid of extraction medium, such as for example sulfuric acid or aqueous magnesium nitrate solutions, the relative volatility of water can be reduced. For higher extraction medium concentrations, such as for example sulfuric acid concentrations of higher than 50% by weight $H_2SO_4$, the formation of an azeotropic point is suppressed. Thus, concentrated nitric acid can be distilled therefrom.

The basic process of concentrating nitric acid is by Pauling (DE 305553, DE 1056095). The process is industrially exploited on a large scale, in technically varying installations. A modern industrial method which is carried out with the extraction medium sulfuric acid is described in the following paragraph for a better understanding of the invention (Schott Engineering GmbH, printed to 60014 D. 8895.0; Comp. FIG. 1). The actual process is essentially carried out in a concentration column (RK in FIG. 1), into which the concentrated sulfuric acid is supplied and somewhat below, the diluted nitric acid. By mixing the components, mixing-and condensation temperatures occur in the column. These amounts of heat are however not sufficient to cover the required energy requirement for the process. Thus, at the foot of the column, steam ("stripping steam") is directly blown into. Aside from its function as a heat carrier, this direct steam effects that the nitric acid is substantially stripped from the diluted sulfuric acid that is running off. The vapors of the concentrated nitric acid, which are given off at the head of the column ("$HNO_3$ exhaust vapors") also contain nitrogen oxides, which are formed by the thermal decomposition of nitric acid. These nitrogen oxides (essentially $NO_2$) are at the same time condensed within the $HNO_3$ exhaust vapors to red smoking nitric acid. In order to obtain the condensed highly concentrated nitric acid in colorless form, the nitric gases contained in the acid are stripped off by air in a countercurrent downstream column, a so-called bleaching column. The waste gases, which contain nitrogen oxides, are cleaned in a subsequent $NO_2$ absorption step.

A complete installation for producing highly concentrated nitric acid comprises aside from the installation for the nitric acid rectification, additionally an installation branch for the extraction medium reconcentration. The installation parts for the afore-described bleaching of the smoking nitric acid, as well as the downstream NOx absorption are also added. It is also appropriate to provide a pre-concentration for the nitric acid to be concentrated ("feeding acid") having a concentration of less than about 58% by weight $HNO_3$. Beyond that, it could also be appropriate to purify the nitric acid through steaming. All parts of the entire installation have to be optimally designed in order to fulfill the required specification with respect to product quantity and wastewater purity with minimal use of resources. The resource consumption and specifically the heating energy requirement decidedly determine the operational cost of the process.

In order to minimize the resources consumption, the required heating energy has to be supplied and utilized optimally in the process. In the classic process, the supply of heating energy is effected directly with steam, the stripping steam. Early on, it was tried to save on direct steam since it could be shown that thereby the requirement of extraction medium (sulfuric acid) can be minimized.

In practice, several solutions have been carried out. In the process where aqueous magnesium nitrate solutions is used as extraction medium, early on, a sump heater was utilized (cf. Ullman's Enzyclopedia of Technical Chemistry; 4th Edition, Volume 20, p. 325). In the process wherein sulfuric acid is used, a so-called intermediate heater, also called a column heater and has being utilized for a long time (Ullman's Encyclopedia of Technical Chemistry; 4th Edition, Volume 20 p. 325).

Furthermore, it is known that it is possible to save heating energy when reflux (internal and/or external) is reduced in the extraction rectification column. An internal reflux occurs for example, when the entry temperature of the extraction medium is lower than the boiling point temperature of the three component mixture, so that a certain amount of heat is first taken up by the extraction medium by partial condensation from the components of the vapor phase.

In the conventional methods, where pure extraction medium is deposited at the head of the extractive rectification column, such as for example sulfuric acid, this extraction medium will first condense nitric acid so that the composition of the fluid mixture is moved into the direction of the equilibrium with the vapor phase. It follows, that the extraction medium has to be deposited in sufficiently cold condition to thereby effect an elevated internal reflux. This leads to an additional amount of heat which in turn can be supplied by means of additional heating energy to the extractive rectification.

It is known that by supplying liquid nitric acid (for example, a partial amount of the nitric acid to be concentrated) to the extraction medium, the condensation behavior of the nitric acid in the column for the extractive rectification can be influenced. Accordingly, EP 0330351 81 ("Günkel") described an admixture of the nitric acid to be concentrated to a partial stream of the extraction medium. A disadvantage of the method described by Günkel is how ever, that the mixture stream of nitric acid to be concentrated and extraction medium is first input below a further amount pure extraction medium already input at an upper location. Thus, the afore-described desired effect of reducing the internal reflux is not attained in the process described in EP 0 330 351.

A further disadvantage of the process according to Günkel is that the entire process comprising also the reconcentration of the extraction medium, the required energy has already been completely supplied to the extractive rectification, although the energy requirement of the extractive rectification is substantially lower than the energy requirement of the extraction medium-reconcentration. With an energy supply of this type, a high amount of extraction medium is necessary for circulation and a large minimum diameter of the extractive rectification column is required.

In the process as described by Günkel 51 to 99% of the amount of nitric acid to be concentrated is fed into the extractive rectification in totally vaporized form. Through this type of input, the amount of steam in the column is substantially raised, so that in connection with the raised amount of extraction medium in circulation, columns of greater diameter are required for the extractive rectification.

A further disadvantage of the process described by Günkel is that at the head of the column a substantially higher reflux amount of highly concentrated nitric acid is required in order to obtain highly concentrated nitric acid vapor containing 99 to 99.9% by weight $HNO_3$.

Until now, in all installations that have been established for highly concentrating subazeotropic nitric acid (weak acid) to nitric acid having more than 90% by weight, preferably more than 98% by weight ("hico-acid") the energy requirement, such as for example, heating steam and cooling water determined the production costs substantially. Thus, in larger installations as they were commonly established in the immediate past, (with sump heater and/or intermediate heater) starting from an $HNO_3$ of 67% by weight, heating steam amounts of about 1.5 kg per kg produced 99% by weight of nitric acid were required.

SUMMARY OF THE INVENTION

Thus, it is an object of the invention, in particular in a generic process to substantially reduce the high operational costs as compared to the conventional methods, respectively installations, wherein possibly the same or even lower installation-operation costs can be realized. In particular, use of columns with large dimensions as they are required for high reflux ratios, respectively high circulation volume of extraction medium, should be avoided.

This object is attained with a method according to the present invention wherein the production of a nitric acid with a concentration of 75 to 99.9% from a more diluted or an impure starting nitric acid includes the steps of contacting a starting nitric with an amount of extractive medium for rectification by feeding the nitric acid of a concentration of about 45 to 70% in a form selected from the group consisting of boiling liquid and in partially vaporized state or separated into vapor and liquid, into an extractive rectification under pressure condition selected from the group consisting of atmospheric pressure, hyperbaric pressure and vacuum and under prevention of forming a nitric acid/water azeotrope, obtaining nitric acid vapors from the rectification step and condensing the vapors to thereby obtain a concentrated nitric acid, reconstituting the extractive medium by reconcentration and returning the extractive medium to the extractive rectification, enriching at least 50% of the amount of extractive medium with nitric acid in an amount of 0.1 to 60% of the starting nitric acid before feeding it into the extractive rectification, and supplying the extractive medium in a form of suitably high concentration to the extractive rectification, while at the same time as the extractive medium, which is in a condition of suitably low concentration, is flowing from the extractive rectification, a circulation amount of extractive medium is minimized, and wherein energy required for the extractive rectification heating is supplied through indirect heating from available process streams of the entire process. Preferred configurations of embodiments of such a method and additional features are further described below.

An installation to carry out an especially preferred embodiment of the method according to the invention using a divided column for the concentration of nitric acid includes a concentration column in the form of one of separate first and second columns or a single column divided into separate first and second separate column portions, at least one supply line for a starting nitric acid provided at the first column, and at least one supply line for an extractive medium liquid and disposed above the nitric acid supply line and in a head portion of the first column, and a line for drawing diluted extractive medium mixture from a sump portion of the first column, and a draw line arranged at a head of the second column for nitric acid vapors expelled from the second column from a diluted extractive medium mixture into the first column, and an indirectly heated recumbent vaporizer provided at a lower end of the second column for receiving the extractive medium for regenerating a regeneration unit, wherein the head portion of the second one of the columns is connected with the line for the diluted extractive medium mixture expelled from the first column and further comprising at least one heat exchanger and a mixer, and wherein the draw line for the starting nitric acid is conducted through the at least one heat exchanger in which at least one heat exchange of at least one hot product stream of the process is realized, and wherein the extractive medium supplied to the first column a controlled amount of the starting nitric acid is admixed within the mixer.

The invention refers further to the generalized principal method for separating azeotropic mixtures by extractive rectification as characterized by a process for the separation of highly concentrated volatile products from diluted aqueous component mixtures or mixtures of organic components comprising the steps of feeding the component mixture to an extractive rectification by contacting the compound mixture in a form selected from the group consisting of boiling liquid, in partially vaporized state or separated into vapor and liquid, with a fluid extractive medium to prevent formation of an azeotropic mixture under pressure conditions of at least one of hyperbaric pressure, ambient pressure and vacuum, obtaining a concentrated product fraction in form of vapors, reconstituting the extractive medium by reconcentration and returning the extractive medium to the extractive rectification, enriching at least 50% of the amount of extractive medium with a portion of the material mixture or the product to be obtained in the form of a concentrate in an amount of 0.1 to 60% of the material mixture to be concentrated prior to feeding the mixture into the extractive rectification, wherein the extractive medium is supplied in a form of suitably high concentration to the extractive rectification, while at the same time as the extractive medium which is in a condition of suitably low concentration is flowing from the extractive rectification, circulation amount of extractive medium is minimized, and wherein energy required for the extractive rectification heating is supplied in whole or in part through indirect heating from available process streams of the entire process.

BRIEF DESCRIPTION OF THE DRAWING

Following, the invention is more closely described with reference to the Figures, which show the different variations of the preferred embodiments of the method according to the invention.

In the figures it is shown.

DETAILED DESCRIPTION PREFERRED EMBODIMENTS

In order to facilitate the understanding of explanations to the features and advantages of the method according to the invention in the various preferred embodiments and configurations, first, concrete embodiments of the method, respectively the installation for carrying out the process with reference to the Figures are further explained.

In describing the Figures it is assumed in exemplary manner that the process concerns the production of a highly concentrated nitric acid of about 99% by weight $HNO_3$ through concentration of a sub-azeotropic nitric acid of about 67% by weight. It is further assumed that sulfuric acid is used as an extraction medium. Any limitations of the method according to the invention in the described conditions should not follow from such a concrete description, but modifications using other concentrations of the starting materials and end products and other extraction media are possible which are expressly comprised within the scope of the invention. The person skilled in the art can, without any problems, adjust any required conditions of the process on the basis of the present description and based on his/her own knowledge of the art.

Figure 1:
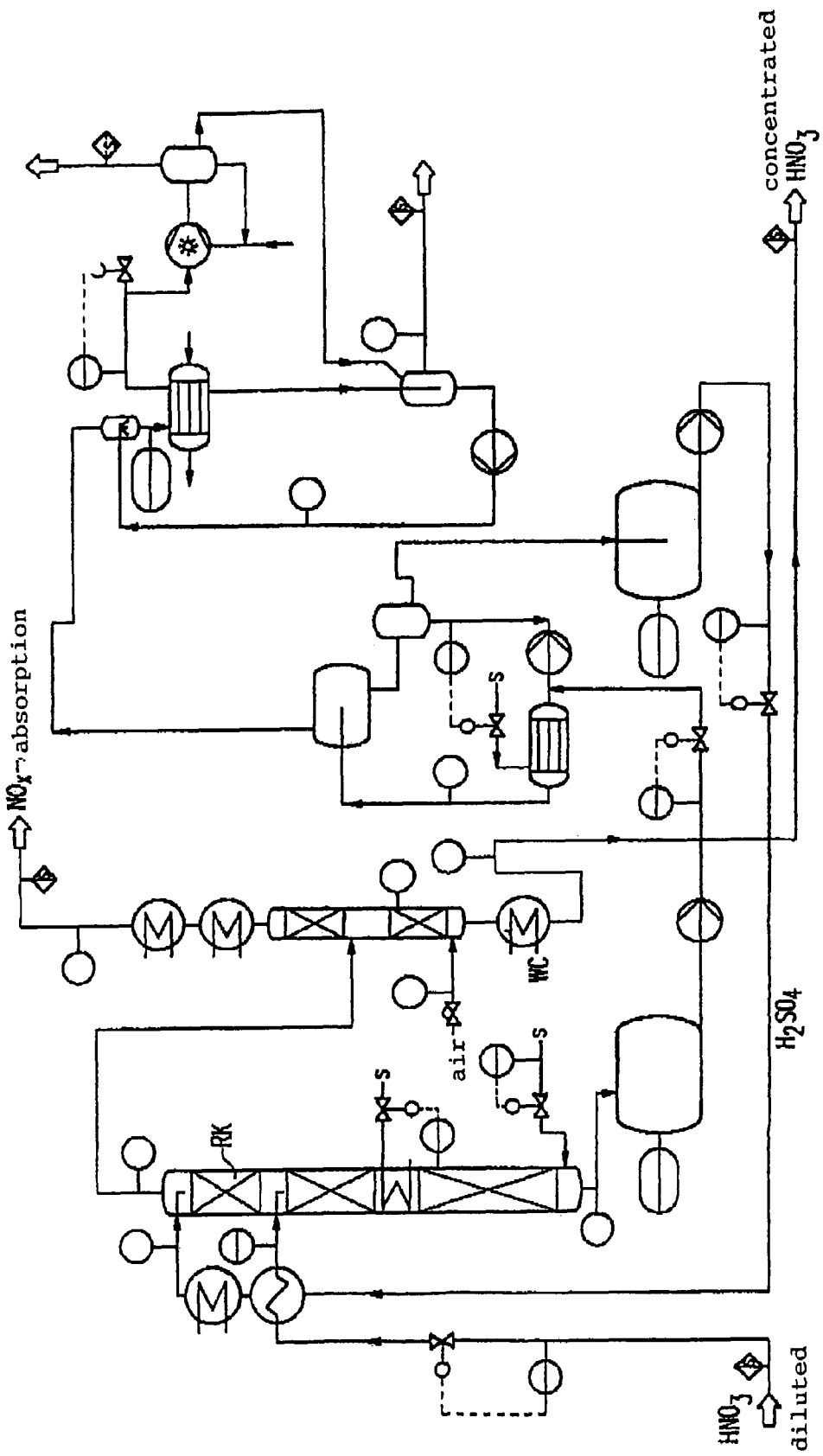
FIG. 1 the flow diagram of a known industrial method for the production of concentrated nitric acid by extractive rectification by using sulfuric acid as extraction medium, with an extractive rectification branch and a branch for the reconcentration of the extraction medium, sulfuric acid, as described in general form in the introductory part of the description.
Figure 2:
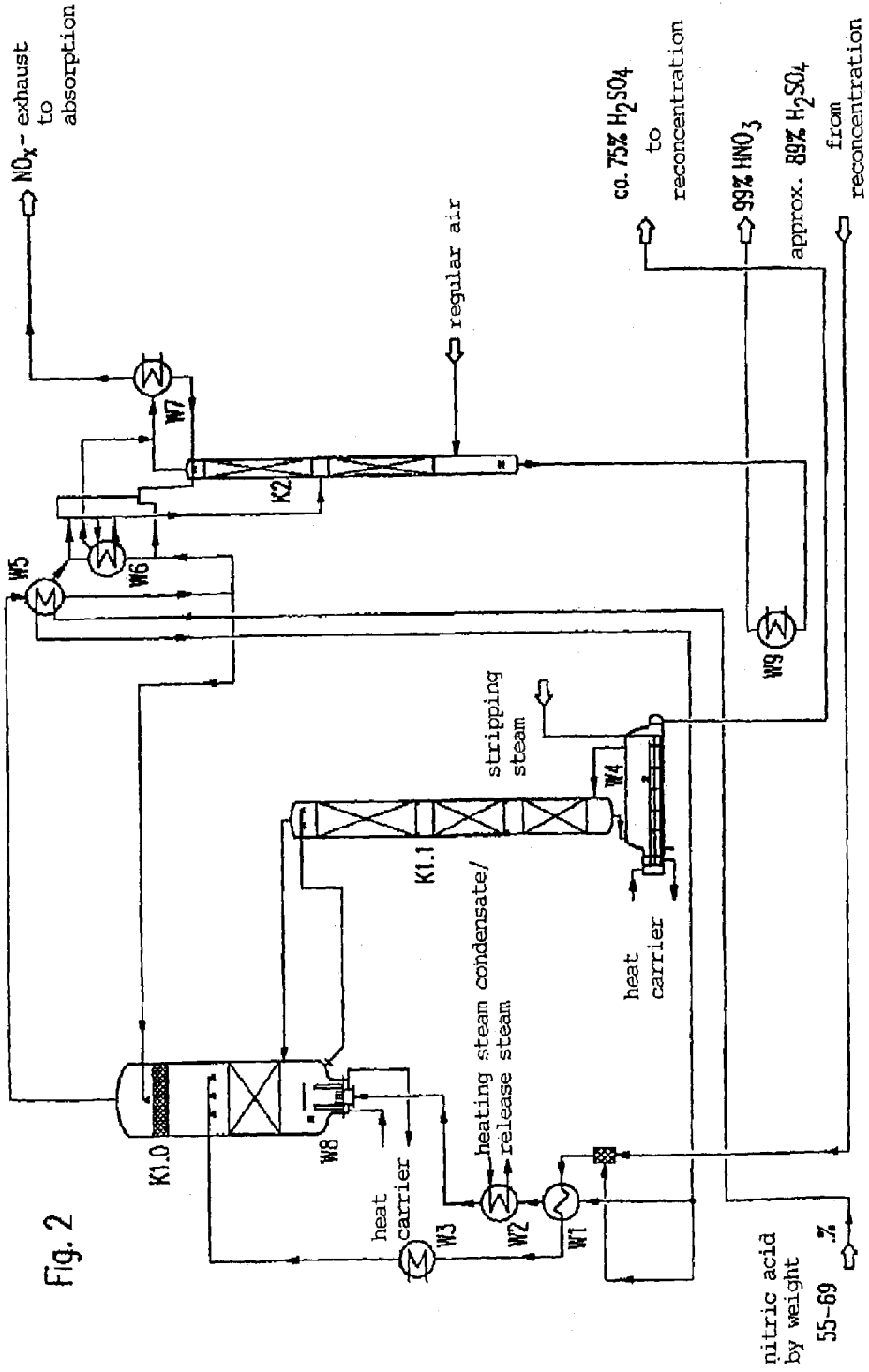
FIG. 2 the flow diagram of the extractive rectification branch of a first embodiment of the method according to the invention utilizing a divided extractive rectification column.

In FIGS. to 2 to 5, parts of the installation, which are functionally equivalent are referred to by the same reference numerals. The following embodiments refer foremost to FIG. 2 in connection with FIG. 3, however they are directly applicable to the embodiment according to FIG. 4, aside from the obvious modifications, which apply to FIG. 4 in that the second column, K. 1.1 is operated at below ambient-pressure and based thereon, is additionally supplemented through partial column K 1.3.

The process, as described in accordance with FIGS. 2 to 5, the concentration of the supplied, approximately azeotropic nitric acid (nitric acid to be concentrated) to 99% by weight is carried out by means of extractive rectification. As an extraction medium, a possibly highly concentrated sulfuric acid, that is, one which is preferably 80 to 96% by weight, is utilized, especially preferred is a sulfuric acid of 89% by weight.

In the most preferred embodiment, the extractive rectification is carried out in two separate columns K 1.0 and K 1.1, wherein the first of the two columns K 1.0 serves in the rectification of the nitric acid to be concentrated and yields of a vapor of concentrated nitric acid ("nitric acid exhaust vapors") and the second of the two columns K 1.1 utilized for separation of nitric acid from the sulfuric acid.

The nitric acid to be concentrated is fed into the sump of the first column K 1.0 by heat exchanger or W5 as well as W1 and W2. The nitric acid to be concentrated is thereby pre-heated in heat exchanger W 5 by means of the exiting nitric acid vapors at the head to the column K 1.0, then further heated in heat exchanger W1 by means of the re-concentrated sulfuric acid and subsequently partially vaporized in heat exchanger W2, which is operated with heating steam condensate.

Figure 3:
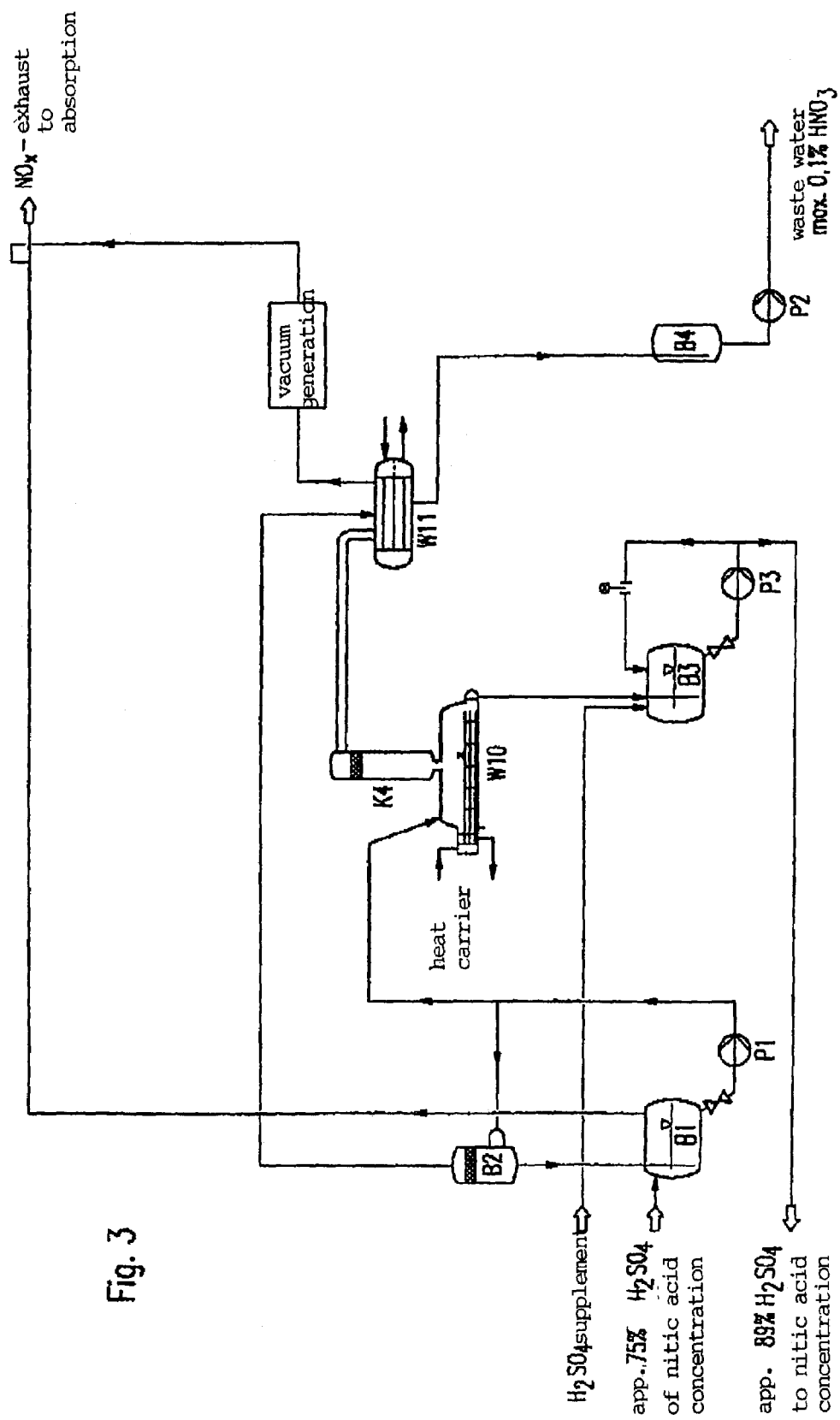
FIG. 3 the flow diagram of the branch for the reconcentration of the extraction medium, as the latter can be carried out in connection with an extraction rectification according to the embodiment of the method according to invention according to FIG. 2.

The re-concentrated sulfuric acid from container B3 (FIG. 3; FIG. 5), which exhibits approximately boiling point temperature is transferred via the heat exchanger W1 and the further heat exchanger W3, which essentially acts as a coolant for the further temperature control of the sulfuric acid, and transported to the head of column K 1.0. A partial stream of the nitric acid to be concentrated is admixed to the sulfuric acid stream via a mixer, which is shown in the FIGS. 2 and 4 in front of the heat exchanger W1. The energy supply to columns K 1.0 and K 1.1, in addition to the partial vaporization in W2, is realized by means of the vaporizer W8 of column K 1.0 and vaporizer W4 (sump heater) disposed at column K. 1.1. The direct supply of a very small amount of stripping steam in W4, respectively the second column K 1. for start and control of the operation serves predominantly to lower the residual nitric acid of sulfuric acid which runs from the vaporizer W4. The nitric acid vapors exiting at the head of the column K 1.0 are partially condensed by means of the heat exchanger W5 and W6 and deposited to the bleaching column K 2 which operates with stripping air. The gas mixture emerging from the bleaching column is subjected to post condensation by a heat exchanger W7. The waste gas containing $NO_x$ is led to $NO_x$ absorption.

The sulfuric acid, which has been conducted at the sump of column K 1.1 via the sump heater W4 is collected in the container B1 (FIG. 3) and conveyed to a vaporizer W10 operated under vacuum for concentrating the acid. A partial stream is conducted via the flash container B2 and subjected there to release vaporization, so that in container B1 a temperature reduction is carried out. The exhaust vapors rising from W10 (mostly steam) are conducted via separation column K 4 into condenser W11 wherein also simultaneously the vapors from the flash container are precipitated.

The condensate reaches the container B4 through introduction via a barometrically submerged pipe. The reconcentrated sulfuric acid having a relatively high temperature, slightly under the boiling point, is brought back from the container B3 into the first column 1.0.

In this afore-described example, the nitric acid concentration is operated at an absolute pressure of about 950 mbar and the reconcentration range for the sulfuric acid operated at an absolute pressure of about 80 mbar.

Figure 4:
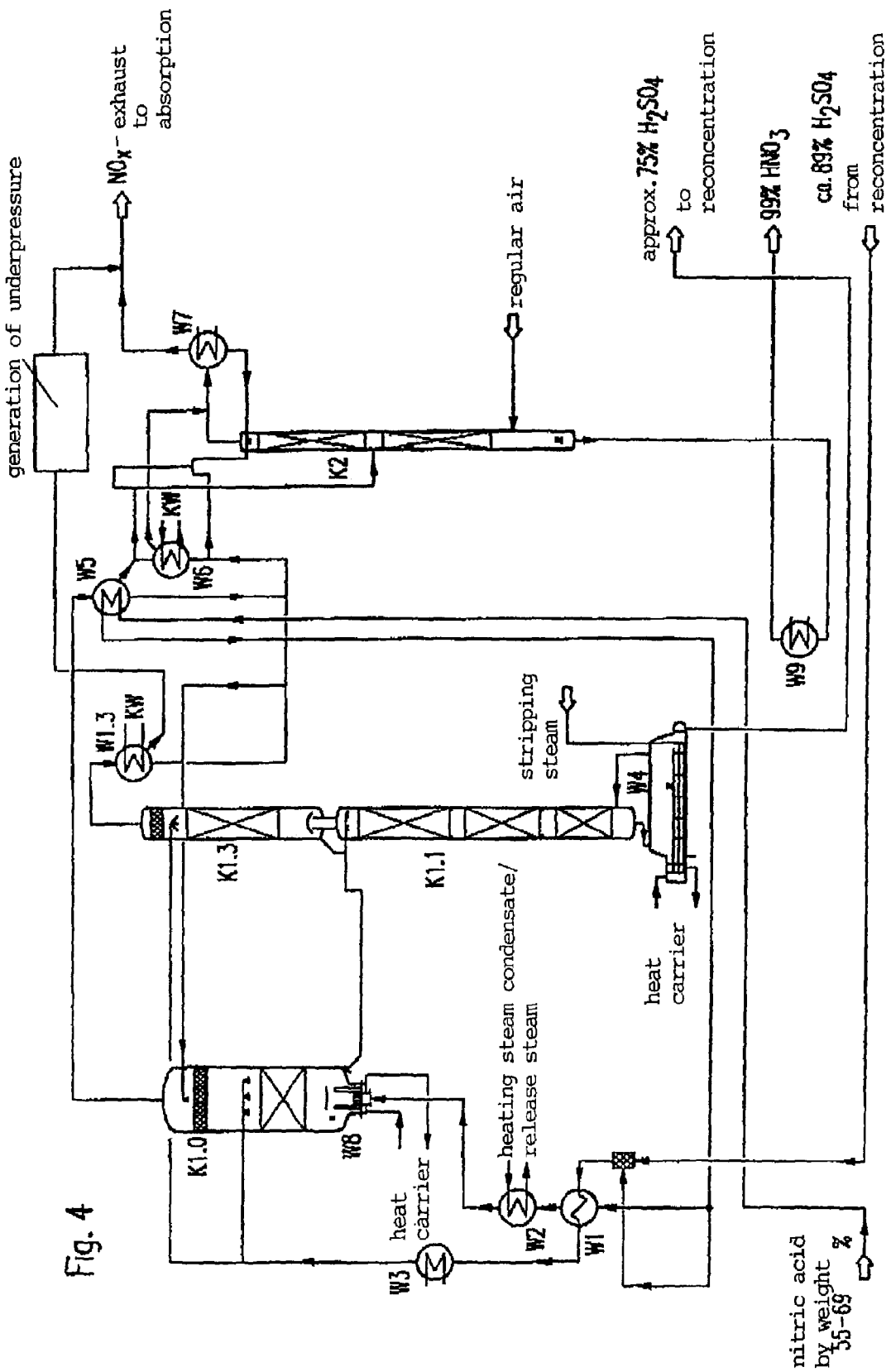
FIG. 4 the flow diagram of the extractive rectification branch of an alternative embodiment of the method in accordance with the invention utilizing a divided extractive rectification column, wherein the second column is operated under pressure.
Figure 5:
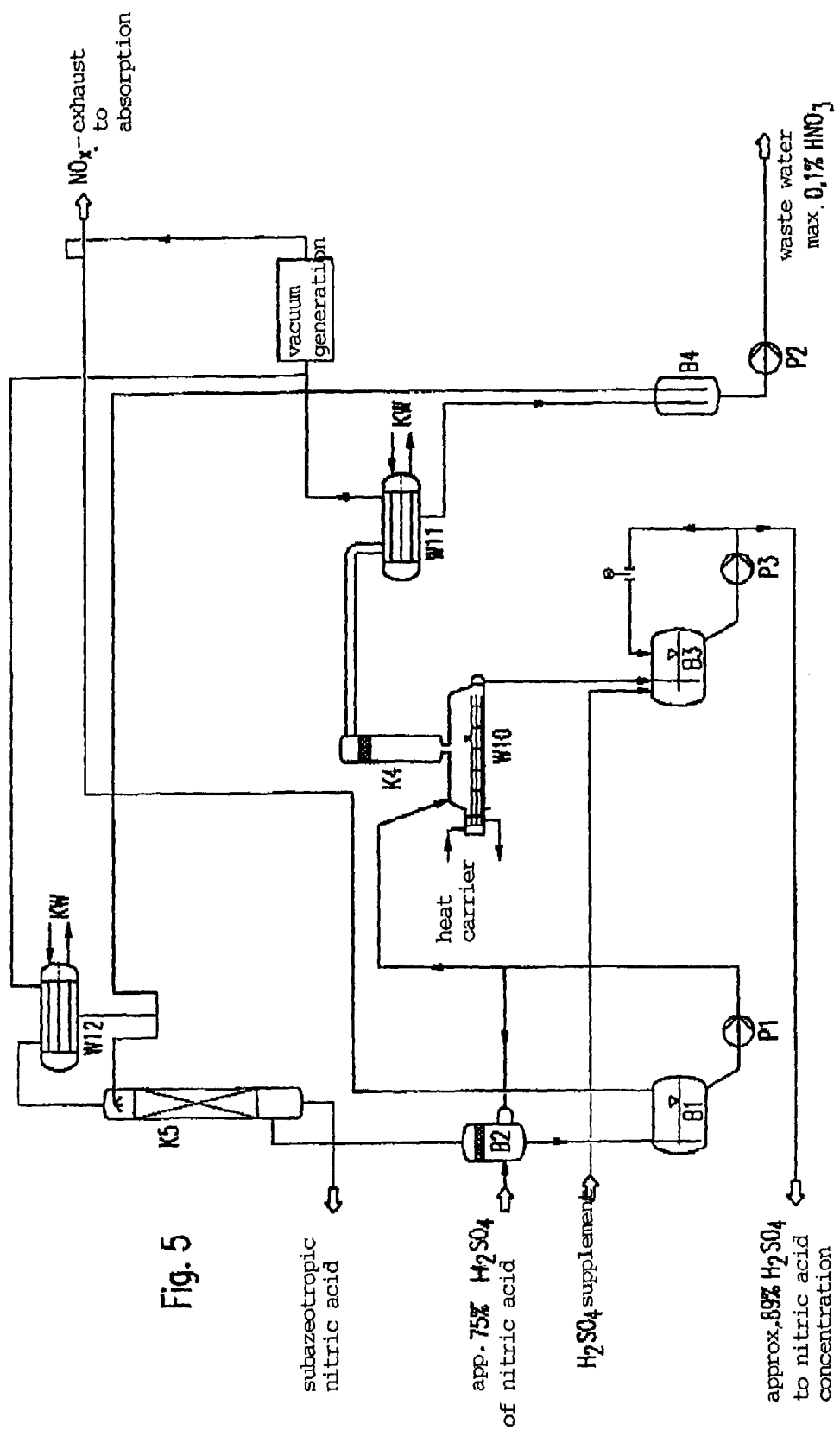
FIG. 5 the flow diagram of the branch for the preparation and reconcentration of an extraction medium which exhibits a relatively high portion of residual-nitric acid, as can be utilized in connection with the extractive rectification according to one of the embodiments of the process in accordance with the invention according to FIG. 2 or 4.

For specific requirements/purposes, the process can be correspondingly varied in accordance with FIG. 4 and FIG. 5. Thereby, the column K 1.1 is operated at below ambient pressure which additionally requires partial column K 1.3 and if applicable, requires an adjustment of the branch for the sulfuric acid reconcentration.

The process according to the invention, as described above with reference to the Figures shows a series of advantages, respectively modifications as compared to the conventional process, which is described in more detail herein in connection with the installation parts wherein the process according to the invention respectively the preferred embodiments of the process, are described in more detail.

The process according to the invention is carried out so that at the head of column K 1.0, a boiling equilibrium is established between nitric acid, sulfuric acid and water. For this purpose, sufficient nitric acid must be contained in the liquid phase, so that in the vapor phase the desired high percentage of nitric acid, up to 99.9% weight $HNO_3$ can be realized. Surprisingly, it has been found, that if prior to inputting the extraction medium into column K 1.0, nitric acid, preferably 55 to 69% by weight nitric acid, is added to the extraction medium, or at least 50% of the extraction medium amount, in an amount of 0.1 to 60% of the entire nitric acid to be concentrated, the boiling equilibrium of the liquid-/vapor mixture at the head of the column K 1.0 is more easily realized. With this input, a reduction of the column-internal nitric acid condensation in the sulfuric acid and thereby a reduction of the required heating energy is realized. Thus, what is desired and controlled is a target volume ratio in accordance with the equilibrium conditions for each of the compositions of the partial streams present (the nitric acid to be concentrated and the reconcentrated sulfuric acid).

Based upon the afore-described measures, the strong cooling of the extraction medium that was heretofore required, for example, in the case of sulfuric acid to under 80° C., can be eliminated and the extraction medium can be supplied in warmer condition, for example, sulfuric acid of a temperature of 90 to 160° C. can be supplied to column K1.0.

Furthermore, in most of the conventionally constructed installations, the nitric acid to be concentrated is supplied as liquid supplied into the extractive rectification. According to the present invention, the heat content of the heating steam condensation stream available in the entire process, which comprises the extractive rectification and the extraction medium-reconcentration is utilized as far as possible, and the nitric acid to be concentrated is partially vaporized and fed to the extractive rectification.

The following amounts of heat that are available in this context and are preferably used as follows:

a) the condensation enthalpy of the nitric acid vapor emerging from the head of column K1.0 (for example by means of the heat exchanger W5).

b) the difference in enthalpy of the reconcentrated extraction medium, for example the sulfuric acid, between exiting from the reconcentration approximately in boiling condition and the entry condition into the column K1.0 (for example, by heat exchanger W1).

c) the difference in enthalpy of the hightensioned heating steam condensate having a pressure in the range of 6 to 40 bar hyperbaric pressure and/or the release steam from the heating steam condensate and/or of a released heat steam/condensate mixture having a pressure in the range from 1 to 16 bar hyperbaric pressure (for example, by means of heat exchanger W2 through heating steam condensate utilization). Preferably, the heating steam condensate which is generated from the installation, from one, or from several, or from all heaters (for example from the heater of vaporizer W4 for the column K 1.1 and/or from the heater W10 of the vaporizer from the reconcentration).

d.) the condensation enthalpy of the exhaust vapors, such as for example, the normal or above normal pressure level of a two or more step reconcentration of the extraction medium, for example the sulfuric acid, at simultaneous vacuum operation of column K 1.1.

When utilizing the amounts of heat according to the afore-stated description under consideration of the admixture of nitric acid to the extraction medium, the nitric acid to be concentrated is fed to column K1.0 in an amount from 40 to 99.9% of the entire amount of nitric acid to be concentrated, below the deposit location of the extraction medium, respectively the extraction medium-/nitric acid mixture in form of a vapor-/liquid mixture or divided into steam and liquid.

The extractive rectification is carried out according to an especially preferred embodiment in two separate columns (K 1.0 and K 1.1) or, which is comparable to a separation into two single columns (K 1.0 and K 1.1), wherein the first one of the two columns (K 1.0) serves the rectification of the nitric acid to be concentrated and obtaining a vapor of concentrated nitric acid, whereas the second of the two columns (K 1.1) serves to separate the nitric acid from the extraction medium. The division into two columns (K 1.0, K 1.1) is realized approximately at the location of the input for the nitric acid to be concentrated. With the aid of corresponding devices, preferably an intimate mixing of the extraction medium, for example the sulfuric acid that trickles down from the upper column K 1.0 with the pre-reheated and partially vaporized nitric acid to be concentrated, is realized.

In order to keep the heating energy requirement for the reconcentration of the extraction medium (e.g. sulfuric acid or also aqueous magnesium nitrate solutions) as low as possible and the amount of water which must be vaporized in the reconcentration should be kept as low as possible. Since in the conventional process, the direct steam which is blown in dilutes the sulfuric acid which is running off, according to the invention, a possibly complete indirect heating of the nitric acid-rectification is desirable, for which purpose the column for extractive rectification is equipped with sump heaters and/or intermediate heaters.

These steps are actually already known. However, the novelty resides in that the configuration of the recumbent vaporizer W4, below the column K1.1, is preferably such that it is supplemented by additional separation steps thereby effecting a reduction of the column height and/or a reduction of the heat supply into the sump of column K 1.1 and/or a reduction of their residual nitric acid content is reached in the extraction medium that is running off. Preferably, a suitable recumbent vaporizer is utilized with W4, wherein resistances are built into the bottom area transverse to the flow direction that form cascade-type system of chambers of distillation bubbles. A suitable vaporizer of the type for the acid concentration is shown, e.g. in a company pamphlet of the applicant herein.

When blowing a certain volume of air and/or water vapor steam into the recumbent vaporizer W4 (FIGS. 2 and 4), preferably into the extraction medium and preferably into the rear area, respectively at the end of the recumbent vaporizer W4, the concentration of the nitric acid in the extraction medium running off can be additionally reduced and/or under retention of the elevated residual nitric acid content in the extraction medium running off, the amount of energy to be supplied and/or the required height of column K 1.1 can be reduced. Preferably, release steam from the heating steam heaters of the entire installation is additionally blown in (stripping steam).

When carrying out the extractive rectification, a single column K 1 (alternatives not shown in the Figures) can also be utilized, when the partially vaporized nitric acid to be concentrated is separated in a side container into a liquid and a vapor phase and the liquid stream is fed into the single column K 1 above the vapor stream.

Independent of the extractive rectification carried out in a single column K 1, or in two separate columns or column portions K 1.0 and K 1.1, a definite novelty of the process according to the invention is that the substantial portion of the steam which is contained in the nitric acid to be concentrated, which has been fed to the system and partially vaporized condition is condensed in a material exchange with the vaporized nitric acid. Due to this exchange, the reflux is reduced, thereby lowering the amount of heat required.

When intimately mixing the extraction medium dripping down with the entering feed stream, the afore-described devices K 1.0 is configured in such a manner that a heater disposed interiorly and/or disposed exteriorly its utilized thereby amplifying the intimate mixing condition.

In addition, a reduction of the required heating energy can be realized, so that according to one of the preferred embodiments an elevated residual content of nitric acid of up to about 5% by weight $HNO_3$ in the extraction medium (e.g. sulfuric acid) is permissible which exits from the recumbent vaporizer W4. To avoid an elevated nitric acid content in the exhaust vapor condensate of the extraction medium reconcentration, the extraction medium running off, which has up to about 5% by weight $HNO_3$ e.g. the sulfuric acid, is released in an vacuum step B2 upstream (FIG. 5) and the nitric acid contained in the exhaust vapor of this step is retained by a downstream rectification column K 5 and returned as an azeotropic nitric acid to the column K. 1.0 (FIG. 5).

Furthermore, in an additional energy saving, the columns K 1.0 and K 1.1 are operated at different pressures. Operational pressures for the extractive rectification are at 100 mbar absolute to about 5 bar absolute, preferably between 200 mbar absolute and 1.3 bar absolute. For the extraction medium- reconcentration, e.g. sulfuric acid, to about 4 bar absolute. By exploiting suitable operational pressures in each one of the areas, heat utilization (release vaporization, heating with exhaust vapors) is realized.

Within the scope of the process according to the invention, optionally the following further energy utilization measures are possible:

a) the column K 1.1 is operated with a substantially smaller pressure as the column K 1.0 (FIG. 4). Thereby, the latent heat of the nitric acid-extraction medium mixture between the sump temperature of column K 1.0 and the boiling point temperature of the mixture at the head of column K 1.1 can be utilized and therefore less steam is required for expelling the residual nitric acid in the sump of column K 1.1.

b) alternatively, or supplementary, the reconcentration of the extraction medium, e.g. the sulfuric acid is carried out in one or more pressure steps, preferably in the range of 50 mbar absolute to 4 bar absolute, wherein the exhaust vapors from the step(s) with the higher pressure for heating the extractive rectification can be utilized, as afore-stated.

c) alternatively, or supplementary, the exhaust vapors from the higher pressure step(s) of the extraction medium reconcentration (FIG. 3; FIG. 5), before or after heating the extractive rectification in one or several separate columns in mostly water with a concentration greater than 90% by weight, preferably 99 to 99.99% by weight; and sump azeotropic nitric acid, are separated, preferably with a concentration off 30 to 69% by weight, whereby the subazeotropic nitric acid is preferably returned to column K 1.0.

To reduce costs in the installation assembly, and if suitable on the basis of space, it is furthermore preferred that a partial stream of nitric acid exhaust vapors which exit from the head of column K 1.0 is condensed in heat exchanger W5 and/or by means of a further condenser W6, before inputting into the bleaching column K 2, and the so obtained condensate is introduced to the head of the bleaching column K 2. The part of the nitric acid exhaust vapors which are not condensed but are required for heating the bleaching column K 2 is conducted into the mid-portion of the bleaching column K 2. As a result, it is possible to substantially reduce the diameter of the bleaching column as compared with those utilized in the conventional process.

In summary, the following advantages of the invention are highlighted:

With the process according to the invention, a reduction of the reflux in the extractive rectification column is realized.

In order to further reduce the internal reflux, the extraction medium can be supplied in warmer condition.

Utilizing the heat content of the various available process streams for a partial vaporization of the nitric acid to be concentrated, requires a smaller amount of heat energy.

Purification of the extraction medium can be realized more easily through the utilization with a recumbent vaporizer (W 4) of suitable configuration.

In the conventional installations for nitric acid concentration, heating steam amounts of about 1.8 kg per 1.0 kg produced highly concentrated nitric acid are required. If, as already known, a sump and/or an intermediate heater is utilized, the specific heating steam requirement is reduced to about 1.5 kg per kg highly concentrated $HNO_3$. In the process according to the invention, the specific heating steam requirement can be reduced to under 1.1 kg per kg highly concentrated $HNO_3$. The evidence for the specific heat energy requirement are applicable for about 67% by weight nitric acid to be concentrated in producing a nitric acid of approximately 99% by weight.

The cooling water requirement is reduced by about the same ratio as the heating steam requirement.

Finally, apparatuses can be configured partially in a smaller scale and/or when using the same size apparatus, a higher operational capacity can be realized as compared with the conventional method.

The core of the process according to the invention refers to an optimization of energy use in separating azeotropic mixtures and was developed in connection with production of a highly concentrated nitric acid, however, the process can be, of course, under guidance of the skilled artisan, adapted to other process parameters without any problems, in that it can be utilized as a process for separating other technical azeotropic material mixtures, where a concentrated product fraction of one of the starting mixture components is to be produced, when, by addition a suitable extraction medium, the azeotropic point can be avoided/overcome in such a process. Typical examples for such material mixtures are halogen- hydrogen/water, in particular chloro- or fluorocarbon/water; alcohol/water in particular ethanol/water or isopropanol/water; ether/water, for example tertahydrofuran/water or mixtures or organic compounds, for example benzol/cyclohexan. The process according to the invention can be also applied successfully and in an economically feasible manner to mixtures of this type. The invention refers also to a process for azeotropic separation in a more general form, with the basic features reflected in claim 22. The advantageous embodiment of the general process correspond to the advantageous embodiments according to patent claims to 2 to 19 as it relates to the features therein, such as most of the concrete temperature data, are not exclusively material-related and are applicable in its form not only in the concentration of nitric acid respectively the use of the extraction medium sulfuric acid outputs.

What is claimed is:

1. A process for the production of a nitric acid with a concentration of 75 to 99.9% from a more diluted or an impure starting nitric acid, comprising the steps of:
    contacting a starting nitric with an amount of extractive medium for rectification by feeding the nitric acid of a concentration of about 45 to 70% in a form selected from the group consisting of boiling liquid and in partially vaporized state or separated into vapor and liquid, into an extractive rectification under pressure condition selected from the group consisting of atmospheric pressure, hyperbaric pressure and vacuum and under prevention of forming a nitric acid and water azeotrope,
    obtaining nitric acid vapors from the rectification step and condensing the vapors to thereby obtain a concentrated nitric acid,
    reconstituting the extractive medium by reconcentration and returning the extractive medium to the extractive rectification,
    enriching at least 50% of the amount of extractive medium with nitric acid in an amount of 0.1 to 60% of the starting nitric acid before feeding it into the extractive rectification, and
    supplying the extractive medium in high concentration to the extractive rectification, while at the same time as the extractive medium, which is in a condition of low concentration, is flowing from the extractive rectification, a circulation amount of extractive medium is minimized, and wherein energy required for the extractive rectification heating is supplied through indirect heating from available process streams of the entire process, wherein the extractive rectification is carried out in two columns separated by an input site for the starting nitric acid, or in a concentration column which is divided into two column portions, wherein the rectification of the starting nitric acid and the yield of the concentrated nitric acid vapor is carried out in a first one of the two columns, and a separation of the nitric acid from the extractive medium is carried out in a second one of the two columns.

2. The process of claim 1 wherein the nitric acid from the enrichment step is of a concentration in the range of the starting nitric acid.

3. The process according to claim 1, wherein the starting nitric acid is introduced into a lower part of the first one of the two columns in preheated form and rectified in the column in countercurrent with the extractive medium, which was enriched prior to its introduction into the first column with nitric acid so that when vapors of the concentrated nitric acid are coming in contact with the extractive medium, the condensation of nitric acid is minimized, and wherein
    the extractive medium from the lower part of the first column is drawn and supplied to a head of the second one of the two columns and separated therein into an extractive medium fluid with a reduced nitric acid-residual content and into a nitric acid vapor whereby the extractive medium liquid is collected in an Indirectly heated sump of the second one of the columns and drawn from there for reconstitution and reconcentration and
    the nitric acid vapor driven from the extractive medium from the head of the second column is returned into the lower part of the first column.

4. The process according to claim 3, wherein the starting nitric acid is preheated or partially vaporized through a heat exchange with one or more process fluids selected from the group consisting of concentrated nitric acid vapor from the first one of the columns, the heated reconcentrated extractive medium, a heating steam condensate, a flash vapor of a heating steam condensate from an indirectly heated vaporizer of the extractive rectification, the extractive medium and the vapor fraction of extractive medium at the reconcentration.

5. The process according to claim 4, wherein the steam condensate which is utilized for preheating the starting nitric acid, is one or more selected from the group consisting of a high pressure heating steam condensate from steam prior utilized for indirect heating and having a hyperbaric pressure of 6 to 40 bar, the flash steam of such a heating steam condensate and a mixture from heating steam condensate and flash vapor having a hyperbaric pressure in the range from 1 to 16 bar.

6. The process according to claim 1, wherein the extractive rectification steps in the two columns are operated in the range of 100 mbar absolute to 5 bar absolute at one of a same on a different system pressure.

7. The process of claim 6, wherein the range is 200 mbar absolute to 1.3 bar absolute.

8. The process according to claim 1, wherein the second column is operated at a lower pressure than the first column.

9. The process according to claim 1, wherein the extractive medium is sulfuric acid and prior to feeding it into the first column, at least 50% of that amount of sulfuric acid is enriched with the nitric acid in a concentration range of the starting nitric acid in an amount from the 0.1 to 6% of the starting nitric acid.

10. The process according to claim 9, wherein the sulfuric acid, is fed into the first column with a temperature in the range from 80° C. to 160° C.

11. The process according to claim 9, wherein the extractive medium collecting in a sump of the second column is being heated in an indirectly heated horizontal vaporizer, disposed in a bottom area and transverse to the flow direction of the acid, is provided with resistances forming a cascading-type chamber system of single distillation vessels thereby making available additional separation steps by the vaporizer and whereby one or more selected from the group consisting of a reduction in height of the second column, a reduction of the required heating energy for the horizontal vaporizer and an adjustment of reduced nitric acid residual concentration of the extractive medium flowing from the horizontal vaporizer, is realized.

12. The process according to claim 11, wherein further reducing the nitric acid residual content is realized by blowing into the horizontal vaporizer at least one of air and steam into the extractive medium flowing from the second column.

13. The process according to claim 12, wherein the steam supplied to the horizontal vaporizer or into the second column as stripping vapor, is a steam obtained from flashing a heating steam condensate.

14. The process according to claim 12, wherein the extractive medium drawn from the horizontal vaporizer of the second column has a residual nitric acid content of up to 5% by weight.

15. The process according to claim 14, wherein during a vacuum step the extractive medium at a content of residual nitric acid in the range of 0.1 to 5% by weight is subjected to a flash vaporization and the resulting nitric acid from the vapor is being retained as a diluted nitric acid and returned to an upstream step, while the extractive medium which has been enriched with respect to its nitric acid portion is subjected to further processing for reconcentration.

16. The process according to claim 15, wherein the diluted nitric acid is returned into the first column.

17. The process according to claim 15, wherein the reconcentration of the extractive medium is carried out in two or more steps at varying pressure in the range from 50 mbar absolute to 4 bar absolute and the vapor fraction from the reconcentration having a higher pressure is utilized to indirectly heat at least one of the starting nitric acid and the extractive rectification column.

18. The process according to claim 17, further comprising separating the vapor fraction prior or after utilization for preheating the starting nitric acid into a fraction substantially consisting of water, in one or several additional columns and into a sub-azeotropic nitric acid, which is returned into an upstream process step.

19. The process according to claim 18, wherein the watery fraction contains 99 to 99.99% by weight water.

20. The process according to claim 19, wherein the vapor of concentrated nitric acid obtained from the first column through heat exchange with the starting nitric acid is at least partially condensed and the liquid concentrated nitric acid obtained after flowing through further condensers is supplied to a head of a bleaching column, while required residual nitric acid vapor is returned to the mid-portion of the bleaching column.

21. The process according to claim 1, wherein the extractive rectification step further comprises introducing partially vaporized nitric acid into at least one of the first and second column and intimately mixing the vapor portion of the partially vaporized nitric acid with the extractive medium or a mixture of extractive medium and the liquid portion or the partially vaporized nitric acid, and intensifying the mixing through devices arranged at the columns.

22. The process according to claim 1, wherein the extractive rectification is carried out in a single column, wherein the starting nitric acid partially vaporized and separated into a vapor phase and a liquid phase is fed into the column, whereby the vapor phase is introduced below a supply site for the liquid phase.

23. An installation for carrying out a process for producing a concentrated nitric acid comprising:
 a concentration column in the form of one of separate first and second columns or a single column divided into separate first and second separate column portions,
 at least one supply line for a starting nitric acid provided at the first column, and
 at least one supply line for an extractive medium liquid and disposed above the nitric acid supply line and in a head portion of the first column, and
 a line for drawing diluted extractive medium mixture from a sump portion of the first column, and
 a draw line arranged at a head of the second column for nitric acid vapors expelled from the second column from a diluted extractive medium mixture into the first column, and
 an indirectly heated horizontal vaporizer provided at a lower end of the second column for receiving the extractive medium, wherein the head portion of the second one of the columns is connected with the line for the diluted extractive mixture expelled from the first column and further comprising at least one heat exchanger and a mixer, and wherein the draw line for the starting nitric acid is conducted through the at least one heat exchanger in which at least one heat exchange with at least one heated product stream of the process is realized, and wherein the extractive medium supplied to the first column in a controlled amount of the starting nitric acid is admixed within the mixer.

24. The installation according to claim 23, wherein the at least one heated product stream is a stream of a vaporized concentrated nitric acid from the first column.

25. The installation of claim 23, the extractive medium is mixed with a portion of the starting nitric acid.

* * * * *